United States Patent
Keal et al.

(10) Patent No.: US 10,247,748 B2
(45) Date of Patent: Apr. 2, 2019

(54) METHOD TO REDUCE DATA RATES AND POWER CONSUMPTION USING DEVICE BASED ATTITUDE GENERATION

(71) Applicant: Invensense, Inc., San Jose, CA (US)

(72) Inventors: William Kerry Keal, Santa Clara, CA (US); James Lim, Saratoga, CA (US); Sinan Karahan, Menlo Park, CA (US)

(73) Assignee: Invensense, Inc., San Jose, CA (US)

( * ) Notice: Subject to any disclaimer, the term of this patent is extended or adjusted under 35 U.S.C. 154(b) by 526 days.

(21) Appl. No.: 13/965,131

(22) Filed: Aug. 12, 2013

(65) Prior Publication Data

US 2014/0278215 A1 Sep. 18, 2014

Related U.S. Application Data

(60) Provisional application No. 61/786,414, filed on Mar. 15, 2013.

(51) Int. Cl.
*G01P 1/00* (2006.01)
*G01C 21/16* (2006.01)

(52) U.S. Cl.
CPC .............. *G01P 1/00* (2013.01); *G01C 21/16* (2013.01); *G01C 21/165* (2013.01)

(58) Field of Classification Search
CPC .......... G01C 21/165; G01P 1/00; G01B 21/16
See application file for complete search history.

(56) References Cited

U.S. PATENT DOCUMENTS

| | | | |
|---|---|---|---|
| 7,216,055 B1 * | 5/2007 | Horton | G01C 21/16 702/150 |
| 8,362,949 B2 | 1/2013 | Yang et al. | |
| 2005/0251328 A1 * | 11/2005 | Merwe | G01S 19/49 701/472 |
| 2007/0032951 A1 * | 2/2007 | Tanenhaus | G01C 21/16 702/151 |
| 2012/0065883 A1 * | 3/2012 | Williamson | G01C 21/165 701/501 |
| 2012/0221244 A1 * | 8/2012 | Georgy | G01C 21/165 701/472 |
| 2012/0326922 A1 * | 12/2012 | Yang | G01S 19/49 342/357.3 |
| 2013/0158928 A1 * | 6/2013 | Hogdal | G01C 21/16 702/104 |

OTHER PUBLICATIONS

Dennis S. Bernstein, "Matrix Mathematics Theory, Facts, and Formulas", Princeton University Press, Princeton & Oxford.
James R. Wertz and Members of the Technical Staff Attitude Systems Operation Computer Eciences Corporation, "Spacecraft Attitude Determination and Control", Kluwer Academic Publishers.

* cited by examiner

*Primary Examiner* — Stephanie E Bloss
(74) *Attorney, Agent, or Firm* — Maryam Imam

(57) ABSTRACT

A method includes generating motion data by receiving a gyroscope data from a gyroscope sensor, performing integration using the gyroscope data and generating an integrated gyroscope data using a first processor. The method further includes receiving a data from one or more sensors, other than the gyroscope sensor, and performing sensor fusion using the integrated gyroscope data and the data to generate motion data using a second processor.

23 Claims, 14 Drawing Sheets

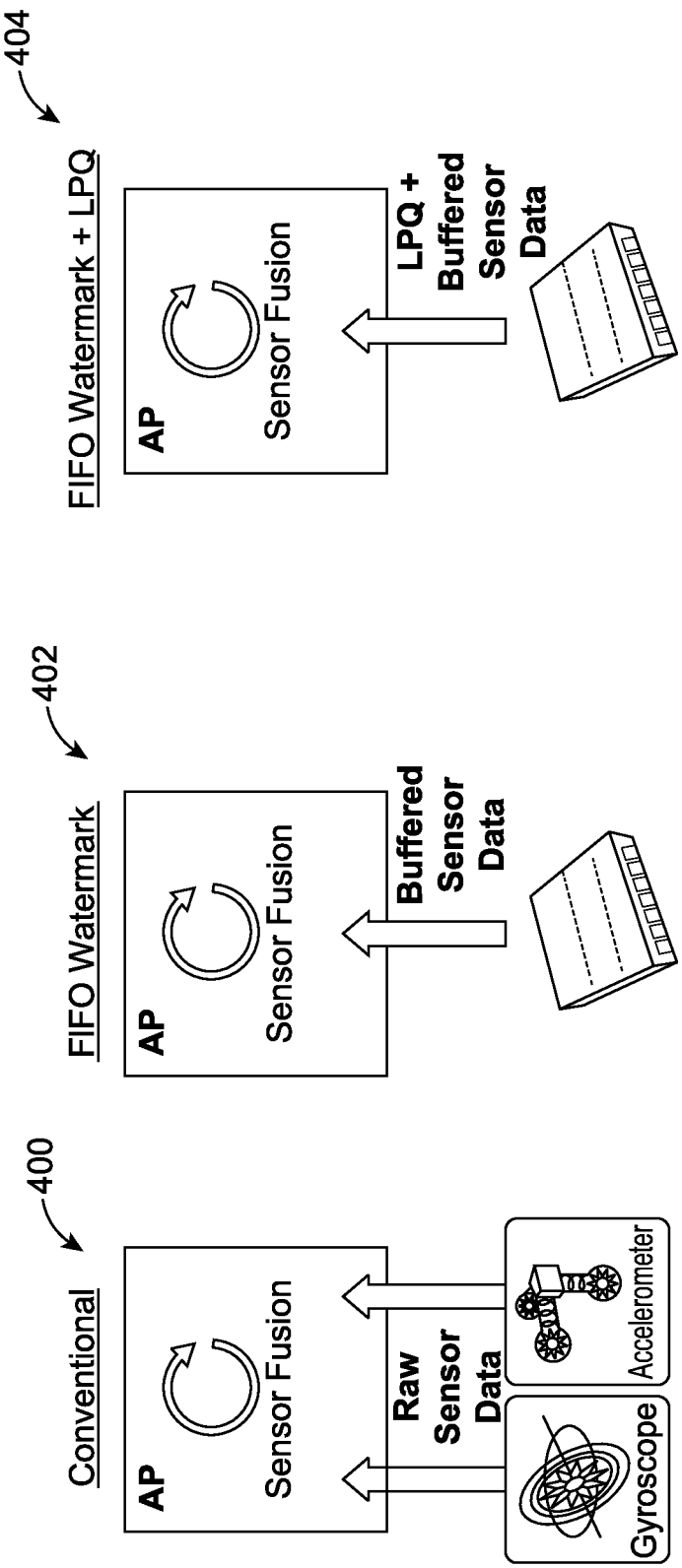

METHOD TO REDUCE DATA RATES AND POWER CONSUMPTION USING DEVICE BASED ATTITUDE GENERATION

CROSS REFERENCE TO RELATED APPLICATIONS

This application claims priority to U.S. Provisional Application No. 61/786,414 filed on Mar. 15, 2013, entitled "A Method to Reduce Data Rates and Power Consumption Using Device Based 3, 6, 9 Axis Quaternion Generation", by Keal et al., the disclosure of which is incorporated herein by reference as though set forth in full.

BACKGROUND

Various embodiment of the invention relate generally to motion sensor data and particularly to integration of gyroscope data to generate motion data.

In applications using gyroscopes, gyroscope data from a gyroscope is collected along with data from a compass and/or an accelerometer and other sensors. The collected data is then fused together to determine the movement of the device. The collected data is also integrated over time and at a high rate to reduce errors. Such high rate data is typically sent from a semiconductor device (or integrated circuit) to a processor. Due to the high rate associated with the integrated data, transmitting high rate data to the processor causes increased power. There is therefore a need for efficient transmission of gyroscope data with a decrease in system power.

SUMMARY

Briefly, a method of the invention includes generating motion data by receiving a gyroscope data from a gyroscope, performing integration using the gyroscope data and generating an integrated gyroscope data using a first processor. The method further includes receiving a data from one or more sensors, other than the gyroscope, and performing sensor fusion using the integrated gyroscope data and the data to generate motion data using a second processor.

A further understanding of the nature and the advantages of particular embodiments disclosed herein may be realized by reference of the remaining portions of the specification and the attached drawings.

BRIEF DESCRIPTION OF THE DRAWINGS

FIGS. 4a-c show conventional processing of raw gyroscope data at 400 in comparison with that of the various embodiments of the invention at 402 and 404.

DETAILED DESCRIPTION OF EMBODIMENTS

Figure 1:
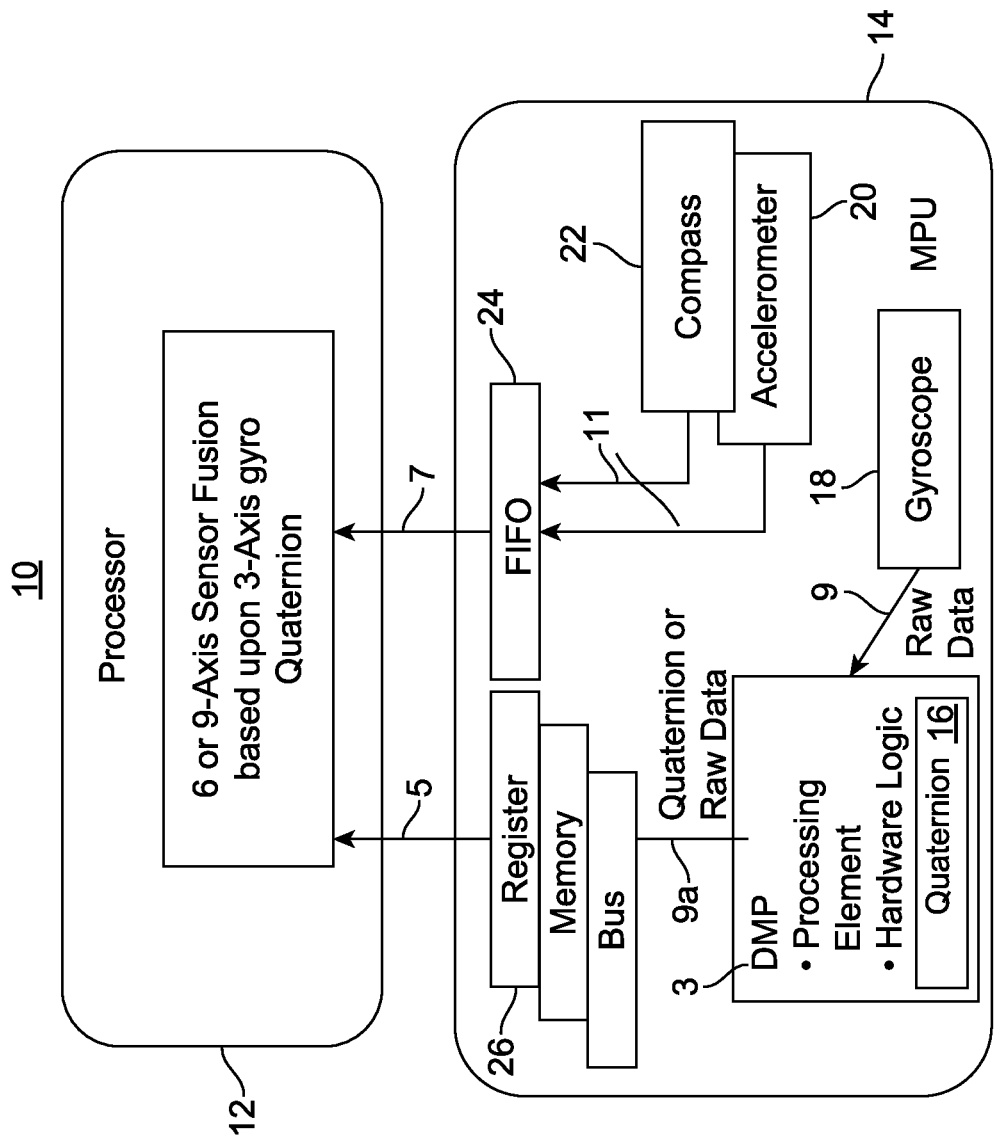
FIG. 1 shows lower rate quaternion data being passed from device 14 to device 10, in accordance with an embodiment of the invention.

In the following description of the embodiments, reference is made to the accompanying drawings that form a part hereof, and in which is shown by way of illustration of the specific embodiments in which the invention may be practiced. It is to be understood that other embodiments may be utilized because structural changes may be made without departing from the scope of the present invention. It should be noted that the figures discussed herein are not drawn to scale and thicknesses of lines are not indicative of actual sizes.

In accordance with an embodiment and method of the invention, integration of gyroscope data is performed in a single device, such as a single semiconductor device. Gyroscope integration is performed at a rate that is higher than the integrated output data rate to reduce the in-device processing requirements. In an embodiment of the invention, integration of the gyroscope data is performed using a curve-fit to reduce the in-device processing requirements. Integration over time, at a higher rate, causes fewer errors. Yet, the integrated data is sent at a lower data rate thereby reducing power consumption. The integrated gyroscope data can also be passed at the same rate as the gyroscope data to reduce computation on the second processor and maintain a consistency for the type of data being sent. In the described embodiments, the integrated gyroscope data is also referred to as a low power quaternion (LPQ).

In other embodiments and methods of the invention, sensor fusion is performed at a lower rate than the rate of the gyroscope data integration. The output of a gyroscope-only quaternion data is saved in a register. In another embodiment, the quaternion data is stored in a first-in-first-out (FIFO) that resides in the same device that includes the gyro. In the case of a semiconductor, the "same device" as used herein refers to the same chip. In some embodiments, the integration of a three-axis gyroscope in the same package as the gyroscope sensor.

In yet another embodiment and method of the invention, removal of a known gyroscope bias is performed after integration. In yet other embodiments the gyroscope bias is removed before integration.

In yet other embodiments, a 9-axis (gyroscope, accelerometer, and compass) motion tracking is employed in a variety of sensor platform architectures, some of which are disclosed herein, and the remainder of which are too numerous to list but that are contemplated.

In the described embodiments, a motion tracking device also referred to as Motion Processing Unit (MPU) includes at least one sensor in addition to electronic circuits. The sensors, such as the gyroscope, the compass, the accelerometer, microphone, pressure sensors, proximity, ambient light sensor, among others known in the art, are contemplated. Some embodiments include accelerometer, gyroscope, and magnetometer, which each provide a measurement along three axis that are orthogonal relative to each other referred to as a 9-axis device. Other embodiments may not include all the sensors or may provide measurements along one or more axis. The sensors are formed on a first substrate. Other embodiments may include solid-state sensors or any other type of sensors. The electronic circuit in the motion tracking device receive measurement outputs from the one or more sensors. In some embodiments, the electronic circuit processes the sensor data. The electronic circuit is implemented on a second silicon substrate. The first substrate is vertically stacked and attached to the second substrate in a single device.

In an embodiment of the invention, the first substrate is attached to the second substrate through wafer bonding, as described in commonly owned U.S. Pat. No. 7,104,129 (incorporated herein by reference) that simultaneously provides electrical connections and hermetically seals the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification.

In the described embodiments, raw data refers to measurement outputs from the sensors which are not yet processed. Motion data refers to processed raw data. Processing may include calibration to remove error or applying a sensor fusion algorithm or applying any other algorithm. In the case of the sensor fusion algorithm, data from one or more sensors are combined to provide an orientation of the device. In the described embodiments, a motion processing unit (MPU) may include processors, memory, control logic and sensors among structures.

Referring now to FIG. 1, device 10 is shown, in accordance with an embodiment of the invention. Device 10 is shown to include a processor 12 and a motion processing unit (MPU) 14. Processor 12 resides externally to MPU 14 and can be a general purpose processor or a specialized processor. In some embodiments, processor 12 is referred to as Application processor (AP). MPU 14 may include a 2 or 3 axis gyroscope or a 3-axis accelerometer or a 6-axis sensor, i.e. 3-axis accelerometer and 3-axis gyroscope, or a 9-axis sensor, i.e. 3-axis accelerometer, 3-axis gyroscope, and 3-axis magnetometer (or compass). In another embodiment, MPU 14 may include a multitude of 3-axis accelerometers, where the accelerometers provide the 3-axes of gyroscope data by determining 3-degrees of freedom of angular velocity. MPU 14 may include a digital motion processor (DMP) 3, such as a specialized processor, memory, analog-to-digital converter (ADC), or a controller.

In operation, MPU 14 generally processes gyroscope data 9 ("gyroscope measurement output" or "gyroscope data") transmitted by gyroscope 18 in DMP 3 and outputs the orientation of the gyroscope in the form of the integration gyroscope data 9a. MPU 14 may transmit data 7 from other sensors, such as but not limited to an accelerometer and/or a compass. MPU 14 generates a gyroscope data output 5 to processor 12. Data 5 has a data rate that is lower than the rate of the gyroscope data output 9. A part of the processing performed by the MPU 14 is quaternion and/or integration in DMP 3.

Similarly, MPU 14 receives raw motion data 11 from accelerometer 20 and the compass 22 and stores raw motion data 11 in FIFO 24 before transmitting to the processor 12.

In FIG. 1, processor 12 is shown to include a sensor fusion that receives the data output from the MPU 14 and generates motion data.

In some embodiments, processor 12 and MPU 14 are formed on different substrates and in other embodiments they reside on the same substrate. In yet other embodiments, the sensor fusion is performed externally to the processor 12 and MPU 14. In still other embodiments, the sensor fusion is performed by MPU 14.

Referring still to FIG. 1, MPU 14 is shown to include a high-rate and low-power Quaternion block 16. Block 16 is shown to receive input from the gyroscope 18 and processes the same using processor 3 (and hardware logic) and outputs Quaternion 9a. The output of gyroscope 18 is actually the output of the gyroscope. Raw data from compass 22 and accelerometer 20 along with the quaternion output 9a are transmitted to the processor. In some embodiments, quaternion, performed by block 16, is integration. In this respect, block 16 includes an integrator that integrates the output of gyroscope 18 at a high rate. In some embodiments, this high rate is at a rate higher than 200 Hz. The block 16, upon performing integration, provides the output of the integration (or Quaternion) to a bus, memory and register 26.

Register 26 and FIFO 24 each provide a low rate output to processor 12. Processor 12 further performs processing by performing a 6 or 9-axis sensor fusion calculation based upon the integrated 3-axis gyroscope data 5 and accelerometer and compass data 7. Data integration at high rate at the block 16 advantageously increases data reliability whereas the low rate between MPU 14 and processor 12 advantageously reduces power consumption. It is noteworthy that block 16, gyroscope 18, compass 22 and accelerometer 20 reside on the same package, in an embodiment of the invention and reside on the same substrate in another embodiment of the invention.

Separation of the MPU 14 and the processor 12 allows users of the MPU 14 to flexibly use the output of the MPU 14. For example, different users of the device 10 may choose the flexibility to use various sensor fusion algorithms while still lowering the power from a reduced transmission rate.

Integration may be performed using sampling that starts from the gyroscope measurement output. In other embodiments of the invention, the sampling starts after a predetermined number of samples and continues over a predetermined time period. In yet other embodiments of the invention, during a dead zone where the input of the integrator or Quaternion (gyroscope data) is close to zero, the output is made to remain the same.

Figure 2:
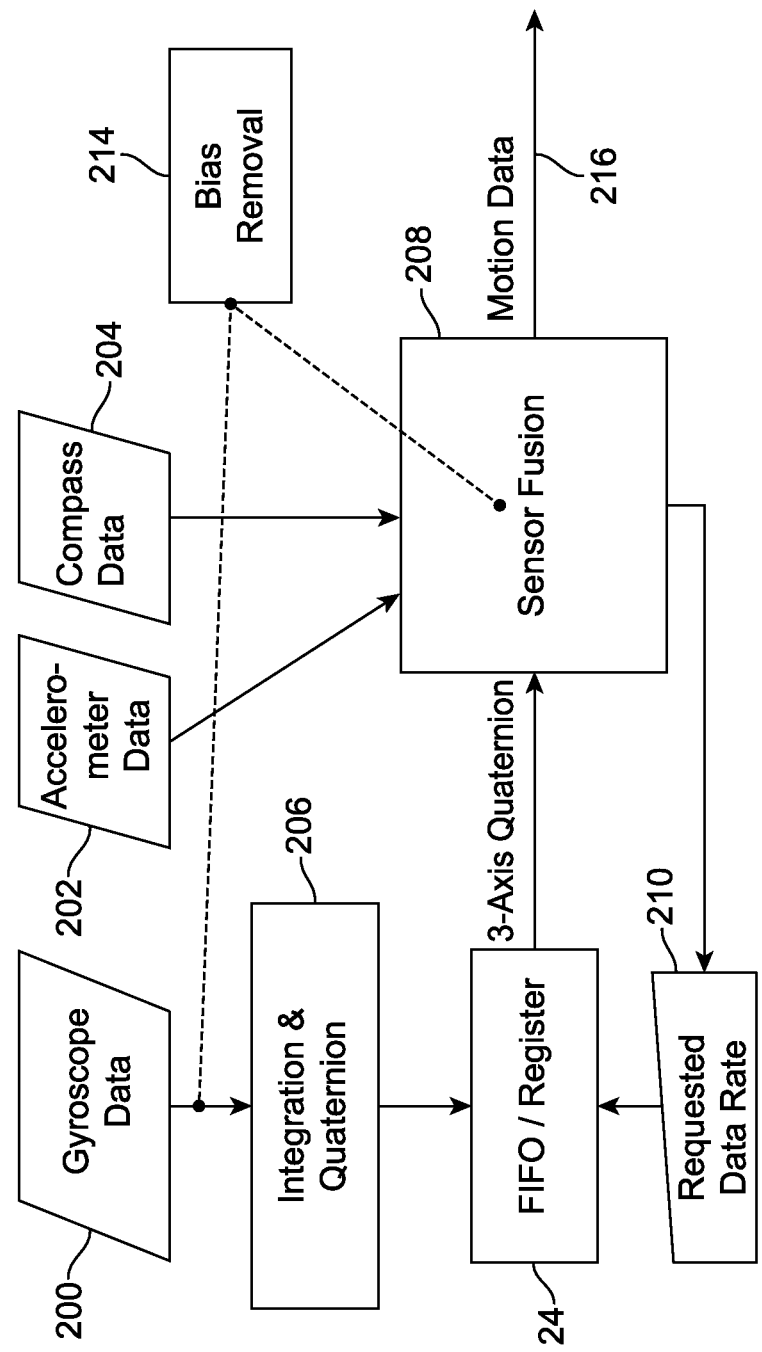
FIG. 2 shows a block diagram of the relevant steps and/or data paths, of the embodiment of FIG. 1.

FIG. 2 shows a block diagram of the relevant steps and/or data paths, of the embodiment of FIG. 1. In FIG. 2, gyroscope data, in its raw form, at 200 is provided to the integration and quaternion block 206, which is a part of the block 16 in FIG. 1. Further details of the Quaternion are provided later below. The integration at 206, as indicated above, is performed at a high rate and the output of 206 is provided to the FIFO/Register 24 for storage. The output of FIFO/register 24 is a Quaternion that is provided to the sensor fusion 208. In an embodiment of the invention, sensor fusion 208 is part of application processor (AP) 12. In another embodiment of the invention, sensor fusion 208 is part of MPU 14.

FIFO/Register 24 is also provided with a requested data rate at 210 and the requested data rate at 210 uses one of the outputs of the sensor fusion 208 to determine the data rate being requested before passing along this information to FIFO/Register 24. Another output of sensor fusion 208 is shown to be the motion data at 216.

Sensor fusion 208 is shown to further receive measurement outputs from accelerometer data 202 and compass data 204. If all three types of data, i.e. gyroscope data, accelerometer data, and compass data, are employed by the sensor fusion 208, the output 216 is a 9-axis Quaternion. In another embodiment, sensor fusion 208 may receive measurement outputs from other sensors such as pressure sensor or microphone. In some embodiments, sensor fusion block 208 may be part of MPU 14 or part of AP 12.

In some embodiments, a bias removal block 214 for removing an inherent bias in the gyroscope. For example, after the gyroscope data at 200 is provided, bias removal 214 can use used to remove the gyroscope's inherent bias. Alternately, bias removal 214 can be applied after integrating gyroscope data in the sensor fusion 208. As will be evident shortly, bias removal may be employed at stages other than at the output at 200.

Figure 3A:
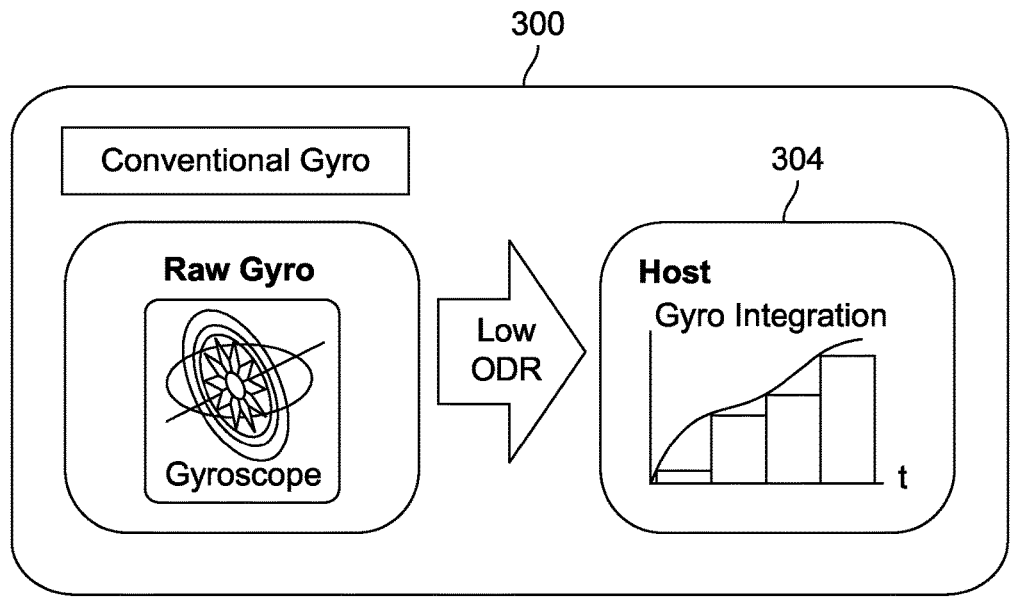
FIG. 3a shows a comparison of the integration of data by a conventional gyroscope, and the various embodiments of the invention.
Figure 3B:
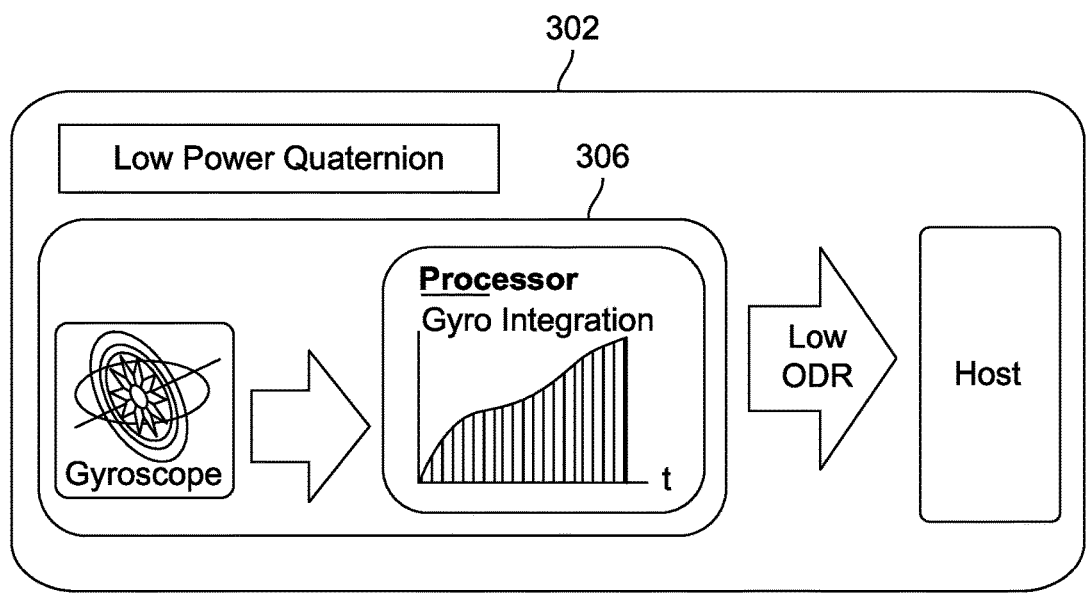
FIG. 3b shows some of the relevant steps of the processing of gyroscope information, in accordance with a method of the invention.

FIG. 3a shows a comparison of the integration of data by a conventional method, at 300, and the various embodiments of the invention, at 302. FIG. 3b shows some of the relevant steps of the processing of gyroscope information, in accordance with a method of the invention.

Referring now to FIG. 3a, in conventional method 300, raw data from gyroscope is transmitted at a low data rate to a host processor for data integration. Precision of gyroscope data can be lost in this process and transmitting data at higher rates consumes more power. In the various embodiments of the invention, at 302, raw gyroscope data is integrated at a higher rate than done in the convention method due to the availability of processing power. Integrated data is then transmitted at slower speeds to the host processor for further processing by the latter while retaining the precision of gyroscope data as well consuming lower power. Graph 304 shows the precision loss of prior art integrations as compared to the higher precision shown in the graph at 306.

FIGS. 4a-c show conventional processing of raw gyroscope data at 400 in comparison with that of the various embodiments of the invention at 402 and 404. In 400, the gyroscope data rate and the sensor fusion rate can be the same. At 402, the sample rate is the same as shown at 400, except the read rate at 402 is equal to a lower rate, such as the screen refresh rate because the data is buffered. At 404, the sample rate is equal to the screen refresh rate ex. 60 Hz. By transmitting the 3-axis low power quaternion (LPQ) data at a rate lower than what is shown at 400, power is saved. The 3-axis refers to 3-axis of the gyro being integrated into a quaternion. 402 has a disadvantage as there is more data traffic than 404. A watermark in FIG. 4 refers to sending an interrupt every at a predetermined number of samples rather than at every sample.

Figure 5A:
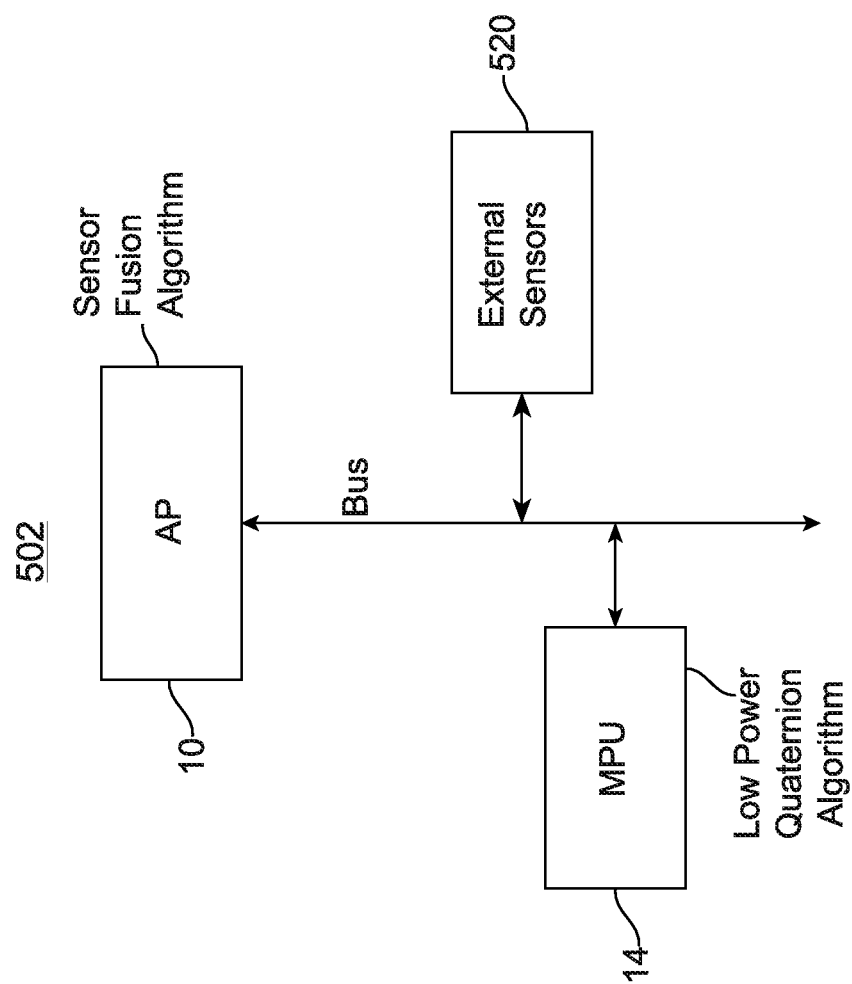
FIGS. 5a-d show various embodiments of the invention, 502, 504, 506, and 508, with each having MPU 14.

FIGS. 5a, 5b, 5c and 5d show various embodiments of the invention, 502, 504, 506, and 508, with each having MPU 14 for receiving measurement outputs from sensors, and application processor 10 (AP) receiving its input in alternative ways from alternative sources via a bus. Optionally external sensor may provide measurement data from various external sensors 520 such as pressure, microphone, proximity, and Ambient Light sensor. In FIG. 5a, in the first embodiment 502, MPU 14 receives measurement output from the sensors, executes the low power quaternion on the raw gyroscope data and transmits sensor data to the AP 10 at a rate lower than the gyroscope data via a bus where sensor fusion algorithm in executed. Optionally, sensor fusion algorithm maybe executed on the data from MPU 14 as well as from external sensors 520. In an embodiment, the bus can be an I²C bus or any other bus.

Figure 5C:
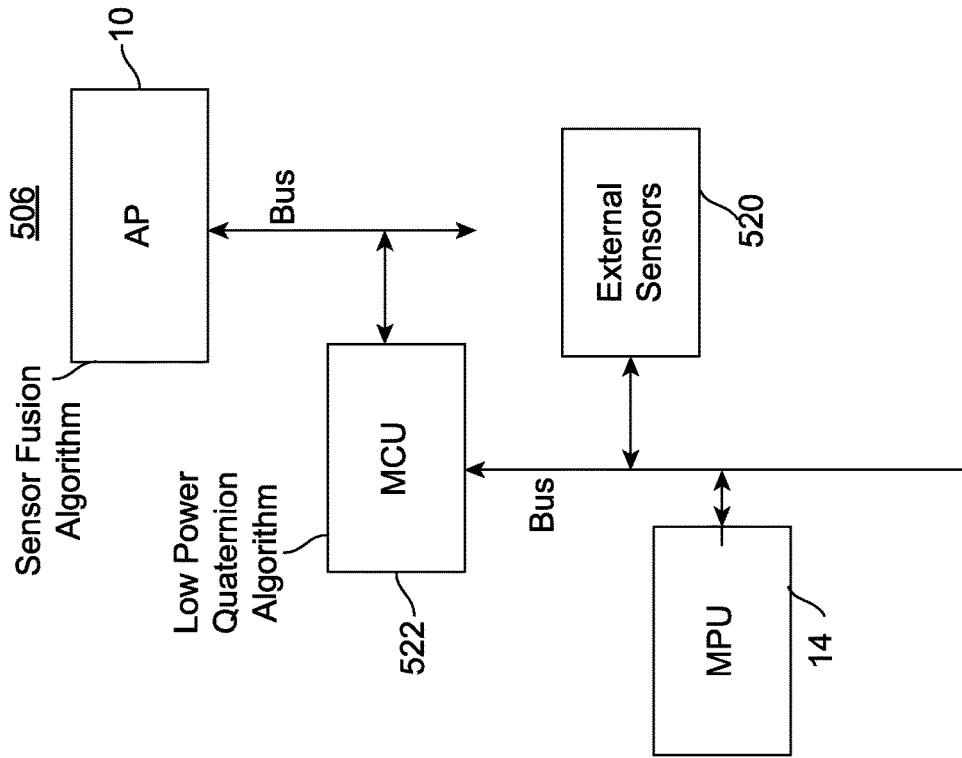
Figure 5B:
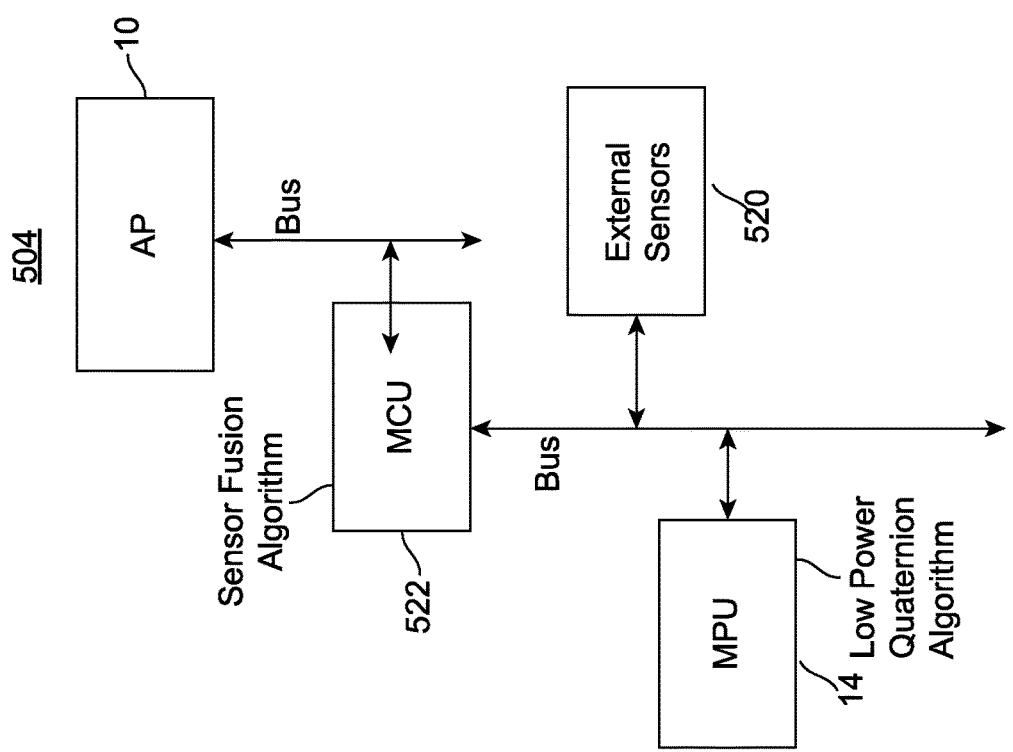

In FIG. 5b, in the second embodiment 504, AP 10 receives its input, through the bus, from the Micro Controller Unit (MCU) 522. In an embodiment, MCU 22 includes a processor and memory. In this embodiment, MPU 14 executes the Low Power Quaternion algorithm where it integrates the gyroscope data into a quaternion and the MCU 522 executes the sensor fusion algorithm. MCU 522 transmits processed motion data to the AP 10 at a lower rate.

In FIG. 5c, in another embodiment 506, MPU 14 transmits raw sensor data a higher rate to the MCU 522. MCU 522 executes the low power quaternion algorithm where it integrates the gyroscope data into a quaternion. MCU 522 transmits MPU 14 data to AP 10 at a lower rate optionally along with the raw data from the external sensors. In this embodiment, the sensor fusion algorithm is executed in AP 10.

Figure 5D:
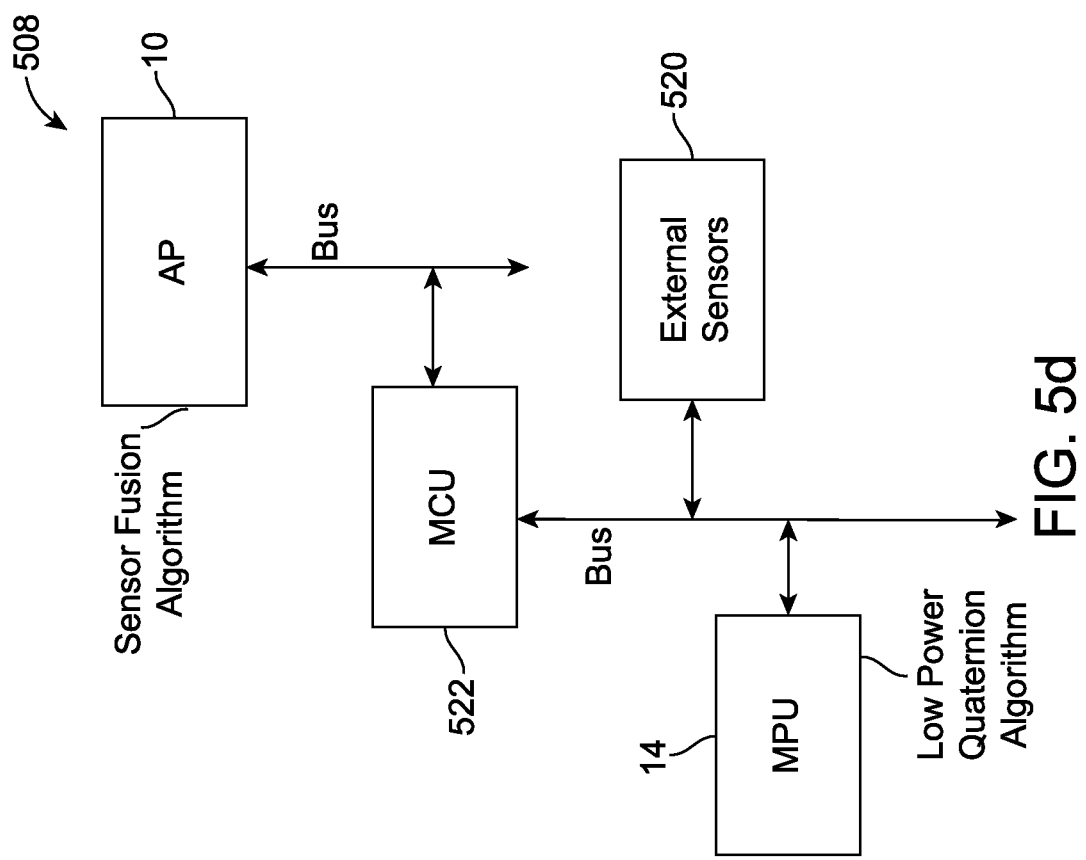

In FIG. 5d, in another embodiment 508, MPU 14 executes the low power quaternion algorithm on the gyroscope data where it integrates the gyroscope data and transmits data to MCU 522. MCU 522 transmits data to AP 10 where sensor fusion algorithm is executes. Optionally, MCU 522 transmits data from external sensors 520.

Figure 6:
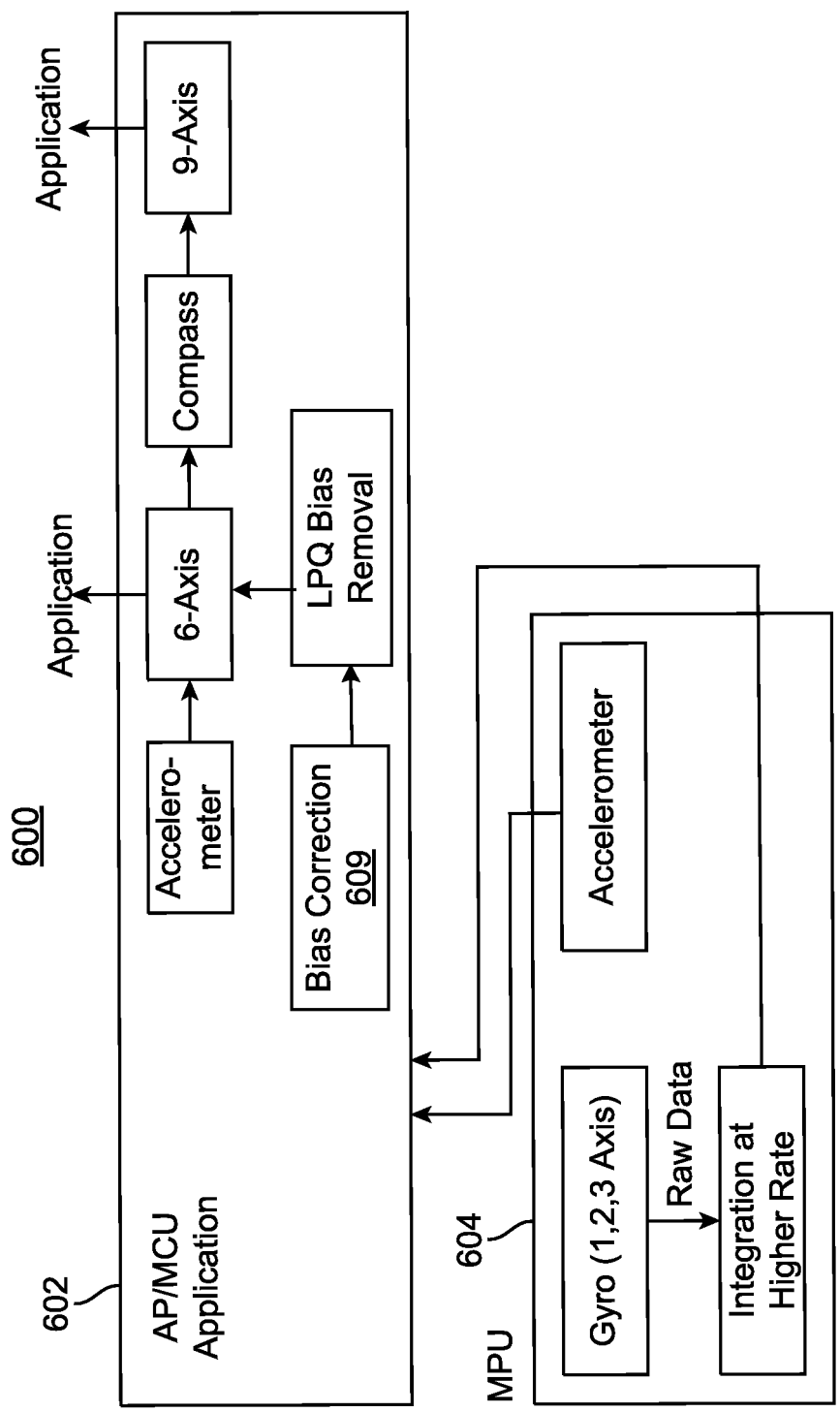
FIGS. 6 through 12 show various embodiments 600 through 1200 of the invention, respectively.

FIGS. 6 through 12 show various embodiments 600 through 1200, respectively, of the invention. More specifically, these figures are of various configurations of a device. It is understood that these configurations are merely exemplary and that others are contemplated. FIG. 6 shows a device 600 to include an AP 602 that is in communication with a MPU 604, which includes an accelerometer and a gyro. The MPU 604 generates integrated gyro data that is sent to 602. In AP 602 the gyro bias is determined in 609 using the integrated gyro data. The gyro bias can be determined by using gyro data derived by taking the derivative of integrated gyro data or by use of a Kalman filter. The gyro bias is removed from the gyro integrated data for use in the 6-axis sensor fusion.

Figure 7:
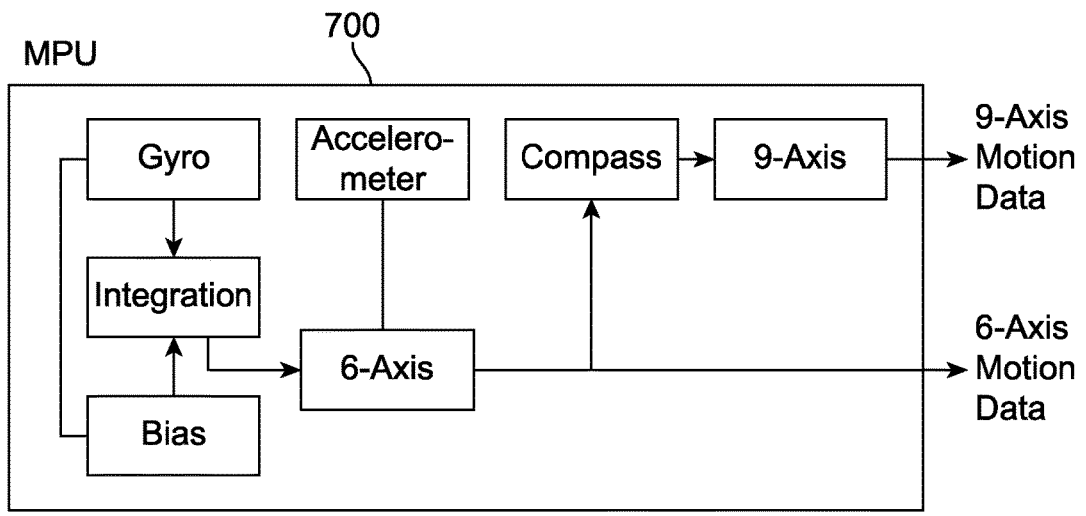

FIG. 7 shows a MPU 700 is shown to include a gyroscope, accelerometer, and a compass and generates a 9-axis motion data as well as a 6-axis motion data.

Figure 8:
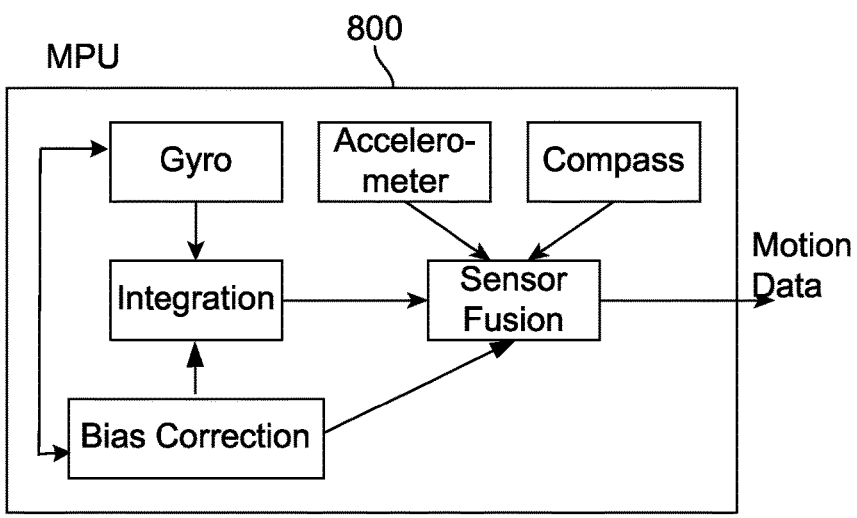

FIG. 8 shows another MPU 800 to include a gyroscope, accelerometer and a compass feeding into a sensor fusion, which outputs the motion data. The output of the gyroscope is integrated and bias correction is performed.

Figure 9:
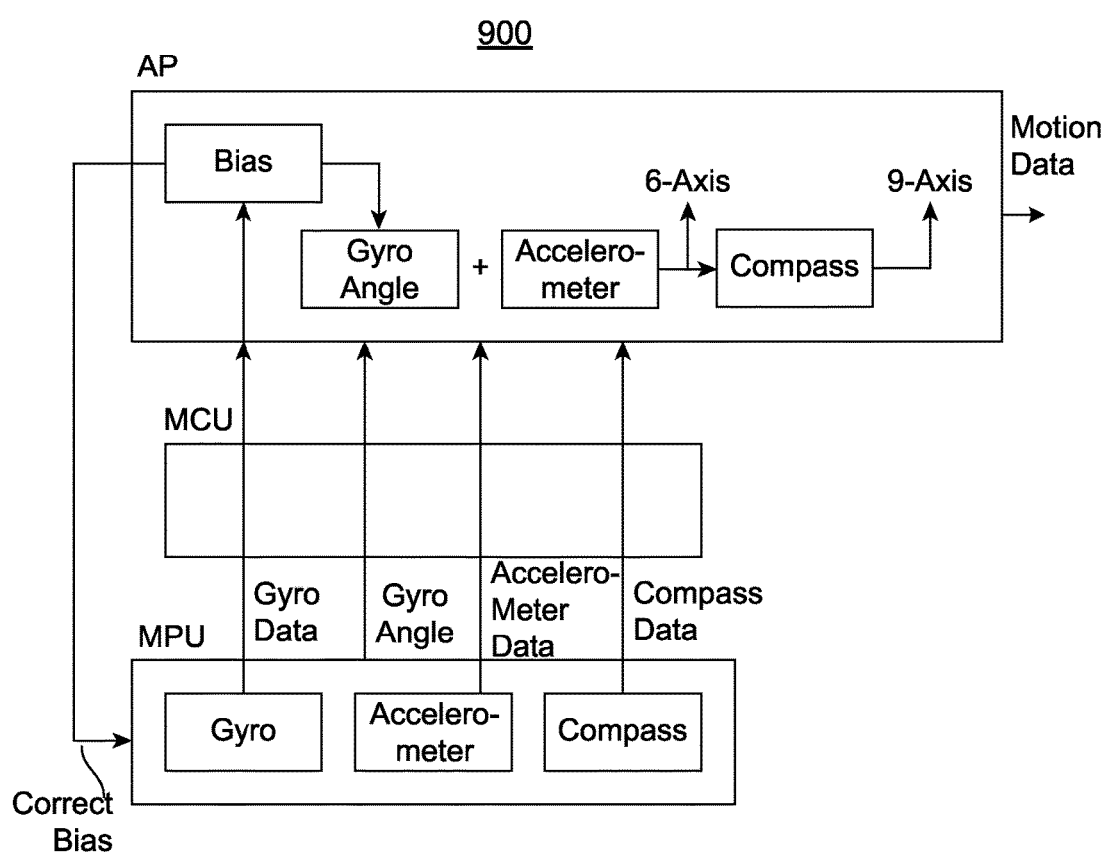

FIG. 9 shows a device 900 to include an AP that is in communication with a MPU through a MCU. Bias correction is performed by the AP and provided to the gyroscope, accelerometer, and compass of the MPU. The AP is shown to output motion data. In this embodiment, MCU functions as a feed through device.

Figure 10:
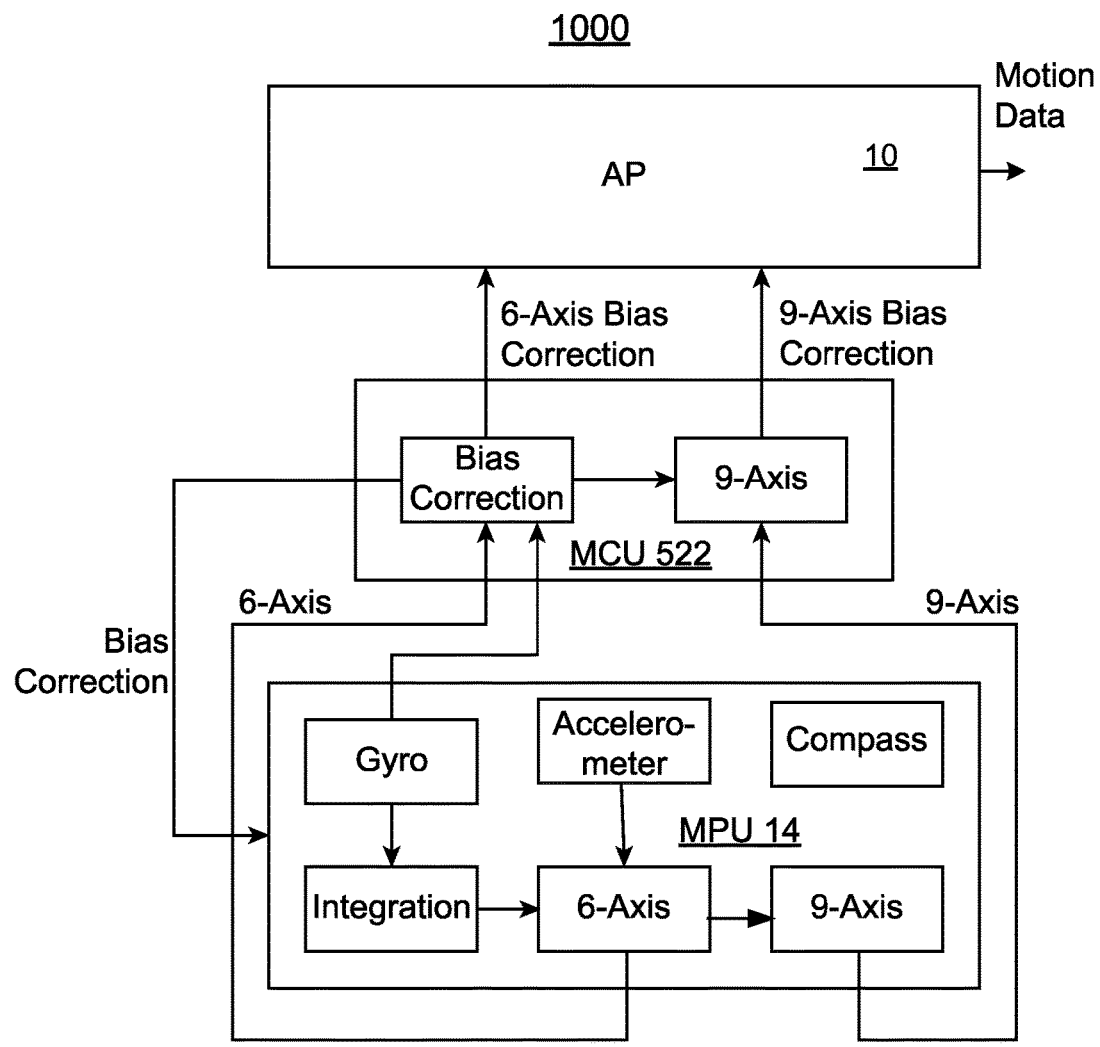

FIG. 10 shows a device 1000 including an AP 10 to be coupled to a MCU 522, which is coupled to the MPU 14. Bias correction/removal is performed by the MCU 522 and the result provided to the MPU 14. The MPU includes a gyroscope, an accelerometer, and a compass.

Figure 11A:
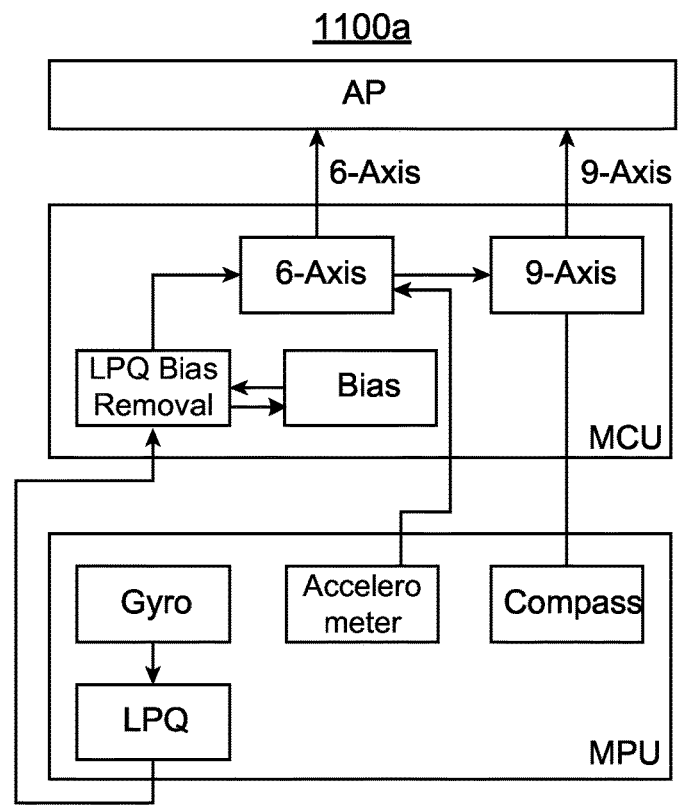

FIG. 11a shows a device 1100a to include an AP that is coupled to a MCU. The MCU is shown coupled to the MPU. The MPU in addition to a gyroscope, accelerometer, and a compass, includes a LPQ whose output is used for bias removal by the MCU. The MCU has a block which takes a LPQ with a bias on it coupled to a bias correction block to remove the bias before sending the LPQ to the sensor fusion 6-axis block.

Figure 11B:
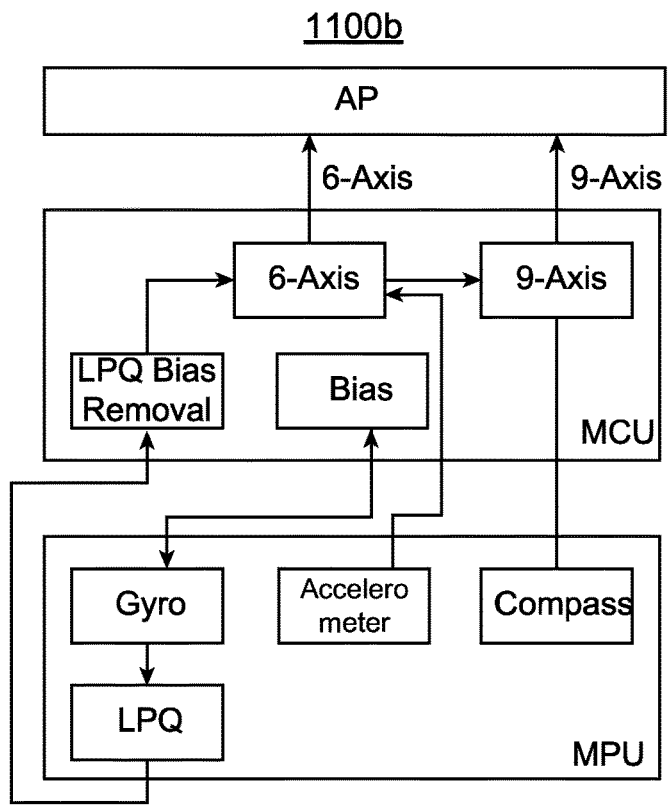

FIG. 11b shows a device 1100b that is analogous to the embodiment of FIG. 11a except that the LPQ of the MCU of the device 1100b is not coupled to the bias correction block. Bias is provided by the MCU, but the correction takes place in the MPU.

Figure 12:
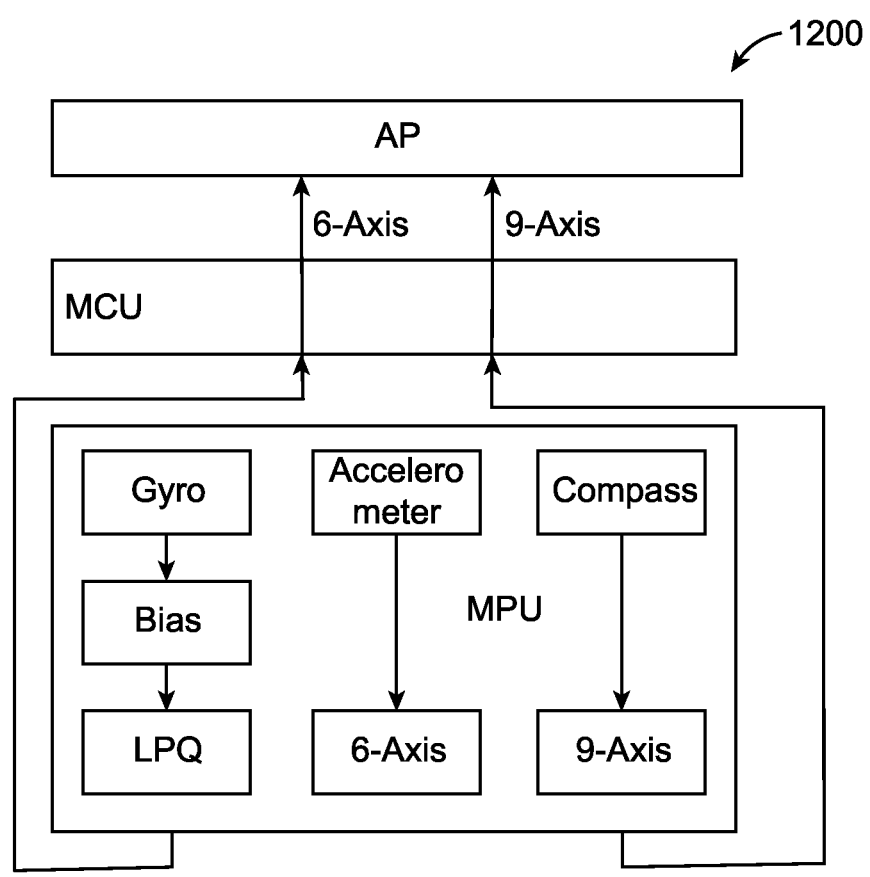

FIG. 12 shows a device 1200 to include an AP that is coupled to an MCU. The MCU is shown coupled to a MPU, which includes a gyroscope, an accelerometer, and a compass. Rather than integrating the output of the gyroscope, a bias correction block and a LPQ, both in the MPU, are coupled to each other and the bias correction block is coupled to the gyroscope. The LPQ generates an output to the MCU. The MPU generates a 6-axis and 9-axis corrections.

The sensor fusion of the various embodiments of the invention calculates the quaternion in accordance with the algorithm and relationships below.

Figure 13:
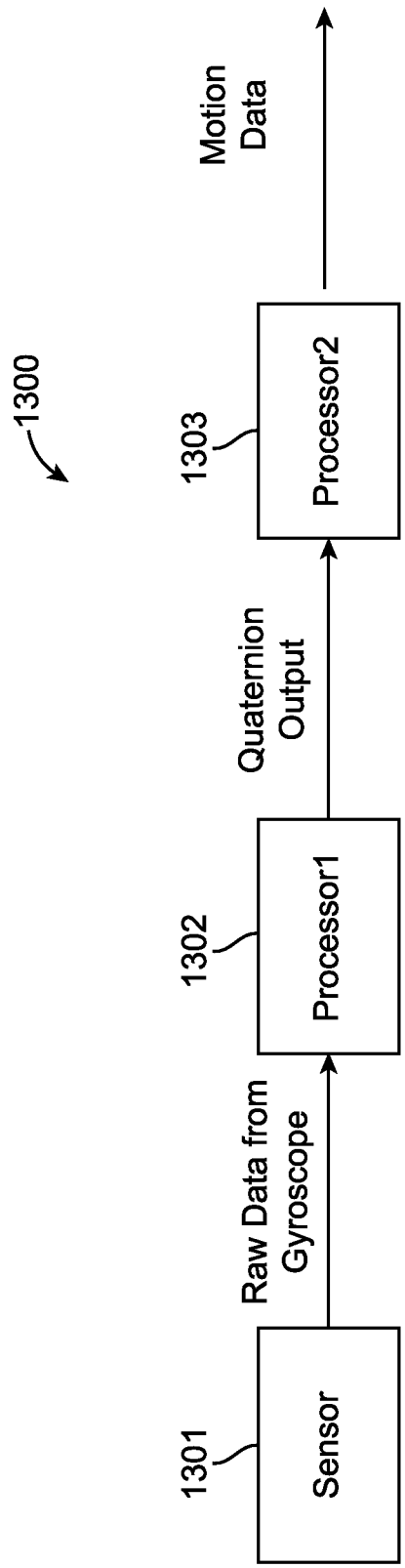
FIG. 13 shows an embodiment in accordance with the invention.

FIG. 13 shows an embodiment 1300 where the sensor data is generated at 1301 and passed to processor1 1302. The sensor data includes gyroscope data as well as other sensor data. Processor1 1302 integrates gyroscope data into a quaternion and transmits the quaternion to another processor2 1303 where sensor fusion of the integrated gyroscope and other sensor data occurs. In an embodiment, sensor 1301, processor1 1302 and processor2 1303 can be on the same semiconductor chip or on three different semiconductor chips. In another embodiment, sensor 1301 and processor1 1302 can be on the same semiconductor chip. In another embodiment, sensor processor1 1302 and processor2 1303 are on the same semiconductor chip.

A unit quaternion, also referred to as "quaternion", is a 4-element vector that describes how to go from one orientation to another orientation. Other equivalent ways to describe going from one orientation to another orientation include a rotation matrix and Euler angles. A unit quaternion has a scalar term and 3 imaginary terms and a magnitude of one for the four element vector. For the purpose of discussion herein, the scalar term is placed first followed by the imaginary term. One skilled in the art would be able to compute slightly different formulas using a different definition of a quaternion. Euler angles describe how to go from one orientation to another orientation by rotating 3 different angles about 3 different axes of rotation. Instead of moving 3 angles about 3 different axes of rotation, the same rotational motion can be described by rotating one angle around a single vector. In Equation 1 below, for a quaternion, the angle $\theta$ is the amount rotated about the unit vector, $[u_x, u_y, u_z]$.

$$\overline{Q} = \left[\cos\left(\frac{\theta}{2}\right), \sin\left(\frac{\theta}{2}\right) \cdot u_x, \sin\left(\frac{\theta}{2}\right) \cdot u_y, \sin\left(\frac{\theta}{2}\right) \cdot u_z\right] \quad \text{Equation 1}$$

A quaternion multiplication is defined in Equation 2 as found in literature. The notation "$\otimes$", as used herein, represents quaternion multiplication in this document.

$$\overline{Q_1} = [q_{1w}, q_{1x}, q_{1y}, q_{1z}]$$

$$\overline{Q_2} = [q_{2w}, q_{2x}, q_{2y}, q_{2z}]$$

$$\overline{Q_1} \otimes \overline{Q_2} = [q_{1w} \cdot q_{2w} - q_{1x} \cdot q_{2x} - q_{1y} \cdot q_{2y} - q_{1z} \cdot q_{2z}, q_{1w} \cdot q_{2x} + q_{1x} \cdot q_{2w} + q_{1y} \cdot q_{2z} - q_{1z} \cdot q_{2y}, q_{1w} \cdot q_{2y} - q_{1x} \cdot q_{2z} + q_{1y} \cdot q_{2w} + q_{1z} \cdot q_{2x}, q_{1w} \cdot q_{2z} + q_{1x} \cdot q_{2y} - q_{1y} \cdot q_{2x} + q_{1z} \cdot q_{2w}] \quad \text{Equation 2}$$

A quaternion inverse is defined as:

$$\overline{Q_1}' = [q_{1w}, -q_{1x}, -q_{1y}, -q_{1z}] \quad \text{Equation 3}$$

Sensor fusion will take measurements from various sensors, such as a gyroscope, an accelerometer and a compass then combine the measurements to determine the orientation of a device referenced to a fixed frame. Each sensor has good points and bad points when combining the data. A rate gyroscope (gyroscope hereafter) is good indicating how the orientation changes overtime without being affected by magnetic disturbance or acceleration. However, a gyroscope often has an offset which leads to angular drift over time. There are many methods of implementing the sensor fusion, but one common aspect of many of those is that the gyroscope data must be integrated. If a gyroscope sensor was perfect and integration was perfect, there would be no need for sensor fusion. However, sensors are not perfect and integration is not perfect, so other sensors are used to correct the orientation. One of the errors incurred, is integration of the gyroscope data. To lower the integration error, the gyroscope data is often integrated at a high rate. Typically a sensor fusion algorithm will take raw sensor data and compute an orientation. The method presented here is to integrate the gyroscope data on one processor then the integrated data is sent to a different processor to do the sensor fusion. When the integrated gyroscope data is sent to the second processor, the integrated gyro data rate can be less than the original gyroscope data rate. The processor doing the gyroscope data integration can be designed to take less power than the processor doing the sensor fusion. Sending the integrated gyroscope data at a lower data rate than the data rate of the gyroscope data has similar performance to sending the gyroscope data out at the original gyroscope data rate. Running sensor fusion at the integrated gyroscope data rate has similar performance to running sensor fusion at the gyroscope data rate. Lowering the sample rate reduces data traffic. Lowering the sensor fusion rate reduces computation. The gyroscope data is not required to be sent out for the sensor fusion, which leads to further data traffic reductions. Approximate gyroscope data can be computed from the integrated gyroscope data being sent out, by computing the derivate of the integrated gyroscope data. The estimate gyroscope data derived from taking the derivative of the integrated gyroscope data (LPQ) can be used for other algorithms such as determining the gyroscope data bias. Sending out integrated gyroscope data also allows a sensor with a gyroscope to output this integrated gyroscope data as an output, and have others write a sensor fusion algorithm using a reduced data rate. In one embodiment, the gyroscope integration will be done into a quaternion and can be done in software, firmware, or hardware on a separate device from the sensor fusion. In an embodiment of the invention, the gyroscope and the processor, performing the integration are in separate packages. In yet another embodiment of the invention, the gyroscope and the processor, performing the gyroscope integration, are in the same package or substrate.

There are several methods of integrating gyroscope data. Given angular velocity in radians/second in Equation 4 with magnitude $\omega_m$ shown in Equation 5.

$$\omega = [\omega_x, \omega_y, \omega_z] \quad \text{Equation 4}$$

$$\omega_m = \sqrt{\omega_x \cdot \omega_x + \omega_y \cdot \omega_y + \omega_z \cdot \omega_z} \quad \text{Equation 5}$$

a quaternion can be defined as shown in Equation 6.

$$\overline{Q_\omega} = \begin{bmatrix} \cos\left(\omega_m \cdot \frac{\Delta t}{2}\right) \\ \frac{\omega_0}{\omega_m} \cdot \sin\left(\omega_m \cdot \frac{\Delta t}{2}\right) \\ \frac{\omega_1}{\omega_m} \cdot \sin\left(\omega_m \cdot \frac{\Delta t}{2}\right) \\ \frac{\omega_2}{\omega_m} \cdot \sin\left(\omega_m \cdot \frac{\Delta t}{2}\right) \end{bmatrix} \quad \text{Equation 6}$$

Where $\Delta t$ is time elapsed between time step M−1 and time step M. To integrate a quaternion using constant angular velocity from time step M−1 to time step M, the formula in Equation 7 is used.

$$\overline{Q_M} = \overline{Q_{M-1}} \otimes \overline{Q_\omega} \quad \text{Equation 7}$$

There are other approximations that can be used to integrate quaternion data such as:

$$\overline{Q_M} = \overline{Q_{M-1}} + \frac{t}{2} \cdot \overline{Q_{M-1}} \otimes \begin{bmatrix} 0 \\ \omega_x \\ \omega_y \\ \omega_z \end{bmatrix} \quad \text{Equation 8}$$

$$\overline{Q_M} = \frac{\overline{Q_M}}{\|\overline{Q_M}\|}$$

In Equation 8, the previous quaternion is multiplied by the rotation rate from the gyroscope (in radians) using a quaternion multiply. This is scaled by the time between samples over 2 and added to the previous quaternion. Next, the quaternion is divided by the magnitude to maintain a magnitude of 1. Note, optimizations that may be used would be to use raw gyroscope units and to scale by a constant that encompasses both the conversion to radians and the sample rate over 2. Other optimizations for the normalization to 1, would be to use a Taylor series to avoid the inverse square root. Furthermore, this could be converted to fixed point or integer math by one skilled in the art.

The gyroscope data typically has noise on it. Integrating noise on the gyroscope data will cause the quaternion to drift. To overcome this drift in a stationary position, the gyroscope data could be set to zero if the absolute value of the gyroscope data is below a threshold.

If the gyroscope bias is known, the gyroscope bias could be subtracted out of the gyroscope data before integrating the gyroscope data. This can be done in software, firmware or hardware.

With each sample of quaternion data that is received, independent of the rate at which the angular velocity was integrated at, an angular velocity bias can be removed even after the bias was integrated into the solution. A quaternion going from one time step to another can be modeled as Equation 9 where $\overline{Q_A}$ is the adjustment between time steps N and N−1. $\overline{Q_A}$ is independent upon the mechanism of going from $\overline{Q_N}$ to $\overline{Q_{N-1}}$. This is similar to Equation 7 and $$\overline{Q_M} = \frac{\overline{Q_M}}{\|\overline{Q_M}\|} \quad \text{Equation 8}$$

going from $\overline{Q_M}$ to $\overline{Q_{M-1}}$ with a constant angular rate.

$$\overline{Q_N} = \overline{Q_{N-1}} \otimes \overline{Q_A} \quad \text{Equation 9}$$

The next step is to maintain a unit quaternion variable with the gyroscope bias removed after the gyroscope bias has been integrated into the quaternion. After combining these ideas, Equation 10 shows how to remove a constant bias.

$$\overline{Q_{BR,N}} = \overline{Q_{BR,N-1}} \otimes \overline{Q_{M-1}}' \otimes \overline{Q_M} \otimes \overline{Q_B} \quad \text{Equation 10}$$

Where $\overline{Q_B}'$ is computed by plugging the gyroscope bias into Equation 6 and taking the inverse as shown in Equation 3. $\overline{Q_{BR,N}}$ is the quaternion with the gyroscope bias removed. To use the integrated gyroscope quaternion with another correction, a transformation between the quaternion result for sensor fusion and the integrated gyroscope quaternion as shown in Equation 10. The sensor fusion quaternion at time N, is shown as $\overline{Q_{F,N}}$ in Equation 11 where $\overline{Q_C}$ is the correction.

$$\overline{Q_{F,N}} = \overline{Q_C} \otimes \overline{Q_{BR,N}} \quad \text{Equation 11}$$

After doing sensor fusion and updating $\overline{Q_{F,N}}$, to the new time step, $\overline{Q_{F,N+1}}$, a new conversion ($\overline{Q_C}$) from the integrated gyroscope quaternion is computed and saved.

$$\overline{Q_C} = \overline{Q_{F,N+1}} \otimes \overline{Q_{BR,N}}' \quad \text{Equation 12}$$

If the bias correction is done before integrated the gyroscope data into a quaternion, $\overline{Q_B}$ would be identity and could be simplified or ignored in all the equations presented. The equations would stay the same.

The basic idea presented so far has the quaternion integration starting from zero and sending out the quaternion referenced from that point. Instead, the starting point could be reset at each time output step so only the change from one time step to the next is sent out. This will simplify some of the equations. This change can be represented as $\overline{Q_A}$ in Equation 9. This would simplify Equation 10 into Equation 13 as follows:

$$\overline{Q_{BR,N}} = \overline{Q_{BR,N-1}} \otimes \overline{Q_A} \otimes \overline{Q_B}' \quad \text{Equation 13}$$

Further optimization would allow the quaternion integration change with bias correction to be applied directly to the sensor fusion quaternion.

$$\overline{Q_{F,N}} = \overline{Q_{F,N-1}} \otimes \overline{Q_A} \otimes \overline{Q_B} \quad \text{Equation 14}$$

Similarly, the $\overline{Q_B}$ term could be simplified or ignored in both Equation 13 and Equation 14 as mentioned above, if the bias correction is done before integrating.

Noted, that while outputting the integration over one time step yields simpler equations, it is less immune to dropping samples. Often, if a system gets overloaded, samples could get lost, if the integration is done cumulatively across many samples, losing a sample would causes less error.

To further reduce the data traffic, it can be noted, that a quaternion has magnitude one, doing so would allow 3 components to be transferred across a data line, and to have the fourth element reconstructed. When trying to reconstruct the fourth element, there can be some sign ambiguity. To overcome the sign ambiguity, it is possible to force the sign of the missing component to have a known value. This is because in quaternion space, $\overline{Q} = -\overline{Q}$. For example, suppose, you want to send the last 3 elements and reconstruct the first element, then if the first element is negative, simply negate all the terms being sent across the data line. Then when reconstructing the first element, it would be known, that that element is always positive.

Other embodiments would include but not limited to other ways to pass information equivalent to quaternion data. As a quaternion represents an orientation in space, an orientation matrix or Euler angles could be substituted for the quaternion.

There are various ways to integrate a quaternion. Below is a description on quaternion integration along with new methods.

Zero'th Order Quaternion Integration:

Integrating a quaternion is equivalent to solving the corresponding first order ordinary differential equation:

$$\dot{Q}(t) = \frac{1}{2} \Omega(\omega) Q(t) \quad \text{Equation 15}$$

Where $$\Omega(\omega) = \begin{bmatrix} 0 & -\omega_x & -\omega_y & -\omega_z \\ \omega_x & 0 & \omega_z & \omega_x \\ \omega_y & -\omega_z & 0 & -\omega_y \\ \omega_z & \omega_y & -\omega_x & 0 \end{bmatrix},$$

is a skew symmetric matrix. Assuming the angular velocity vector ω is constant between time t and t+Δt. The generalized solution to this differential equation is $$\overline{Q}(t+\Delta t) = e^{\frac{1}{2}\Omega(\omega)\Delta t}\overline{Q}(t) \qquad \text{Equation 16}$$

In order to calculate the above solution, the matrix exponent of the skew-symmetric matrix Ω has to be calculated. Calculating the exponent of a matrix numerically is very expensive. In real-time implementations, a simplified approximation is used, with the procedure:

$$\Delta\overline{Q} \approx \dot{\overline{Q}}(t) \otimes \Delta t \qquad \text{Equation 17}$$

Where (1) is used with a Forward Euler approximation, and $$\overline{Q}(t+\Delta t) = \overline{Q}(t) + \Delta\overline{Q} \qquad \text{Equation 18}$$

$$\overline{Q}(t+\Delta t) = \frac{\overline{Q}(t+\Delta t)}{\|\overline{Q}(t+\Delta t)\|} \qquad \text{Equation 19}$$

In this approximation, the change in the quaternion is not computed in the rotation space, i.e. Equation 18 violates the rules of quaternion algebra. This causes small errors in the quaternion calculation, which can grow over time. In order to maintain an accurate quaternion with unit norm, the quaternion is re-normalized, as shown in the final step Equation 19.

An alternative method to compute Equation 16 more accurately is as follows. First, the matrix $$e^{\frac{1}{2}\Omega(\omega)\Delta t}$$

is expanded in a Taylor Series as follows:

$$e^{\frac{1}{2}\Omega(\omega)\Delta t} = \qquad \text{Equation 20}$$
$$I_{4\times 4} + \frac{1}{2}\Omega(\omega)\Delta t + \frac{1}{2!}\left(\frac{1}{2}\Omega(\omega)\Delta t\right)^2 + \frac{1}{3!}\left(\frac{1}{2}\omega(\Omega)\Delta t\right)^3 + \ldots$$

Using the properties of the skew-symmetric matrix Ω(ω) and the Euler formula, as discussed in the reference "Matrix Mathematics: Theory, Facts, and Formulas", Princeton University Press, Second Edition, 2009, by Dennis S. Bernstein, p. 741, exponents of skew-symmetric matrices can be rewritten as:

$$e^{\frac{1}{2}\Omega(\omega)\Delta t} = \cos\left(\frac{\omega_m}{2}\Delta t\right)I_{4\times 4} + \frac{1}{\omega_m}\sin\left(\frac{\omega_m}{2}\Delta t\right)\Omega(\omega) \qquad \text{Equation 21}$$

Where $\omega_m$ is the magnitude of the angular rate ω, as defined in $\omega_m = \sqrt{\omega_x \cdot \omega_x + \omega_y \cdot \omega_y + \omega_z \cdot \omega_z}$ Equation 5. Then, $$\overline{Q}(t+\Delta t) = \left(\cos\left(\frac{\omega_m}{2}\Delta t\right)I_{4\times 4} + \frac{1}{\omega_m}\sin\left(\frac{\omega_m}{2}\Delta t\right)\Omega(\omega)\right)\overline{Q}(t) \qquad \text{Equation 22}$$

Close inspection of Eqn. Equation 22 reveals that this matrix-vector multiplication is equivalent to a quaternion multiplication:

$$\overline{Q}(t+\Delta t) = \begin{bmatrix} \cos\left(\frac{\omega_m}{2}\Delta t\right) \\ \frac{\omega}{\omega_m}\sin\left(\frac{\omega_m}{2}\Delta t\right) \end{bmatrix} \otimes \overline{Q}(t) = \Delta\overline{Q} \otimes \overline{Q}(t) \qquad \text{Equation 23}$$

Where $$\Delta\overline{Q} = \begin{bmatrix} \cos\left(\frac{\omega_m}{2}\Delta t\right) \\ \frac{\omega}{\omega_m}\sin\left(\frac{\omega_m}{2}\Delta t\right) \end{bmatrix}$$

is the 4×1 quaternion that represents the quaternion rotation induced by the angular velocity ω over time span Δt. Comparing this with Equation 18, it is noted that the formula in Equation 23 is exact, and it preserves the quaternion norm, i.e. no re-normalization of the quaternion is necessary.

Note that for very small angular velocity ω, the above expression can cause numerical instability. In this case, a first order approximation of Equation 21 can be used:

$$\lim_{\omega\to 0} e^{\frac{1}{2}\Omega(\omega)\Delta t} = I_{4\times 4} + \frac{1}{2}\Omega(\omega)\Delta t \qquad \text{Equation 24}$$

First Order Quaternion Integration:

The zero'th order quaternion integration assumes that the angular velocity ω is constant over the period Δt. A better and more accurate integration can be derived if the angular velocity is assumed to be evolving linearly over the time Δt. For this purpose, $\omega(t_k)$ is introduced for the value of velocity ω at time $t_k$, and $\omega(t_{k+1})$ for ω at time $t_{k+1}$, with $\Delta t = t_{k+1} - t_k$.

The average angular velocity over the time Δt is:

$$\overline{\omega} = \frac{1}{2}(\omega(t_{k+1}) + \omega(t_k)) \qquad \text{Equation 25}$$

Also, define the derivative of the angular velocity as $\dot{\omega}$. The corresponding matrix $\Omega(\dot{\omega})$, in the linear case, is constant:

$$\Omega(\dot{\omega}) = \Omega\left(\frac{\omega(t_{k+1}) - \omega(t_k)}{\Delta t}\right) \qquad \text{Equation 26}$$

And the higher order derivatives are zero due to the assumption of linearly changing angular velocity ω. In the following, Ω(ω) is represented as Ω, and Ω($\dot{\omega}$) as $\dot{\Omega}$ for conciseness.

As described in the publication "Spacecraft Attitude Determination and Control", edited by J. R. Wertz, D. Reidel Publishing Co., Dordrecht, The Netherlands, 1978, p. 565, Eqn. (17-21)] in order to derive the higher order quaternion derivative expression, the Taylor series expansion of the quaternion is done at time instant $t_{k+1}$ in terms of the quaternion and its derivatives at time $t_k$ is as follows:

$$\overline{Q}(t_{k+1}) = \left[I_{4\times 4} + \frac{1}{2}\Omega\Delta t + \frac{1}{2!}\left(\frac{1}{2}\Omega\Delta t\right)^2 + \frac{1}{3!}\left(\frac{1}{2}\Omega\Delta t\right)^3 + \ldots\right] \qquad \text{Equation 27}$$

-continued
$$\overline{Q}(t_k) + \frac{1}{4}\dot{\Omega}\Delta t^2 \overline{Q}(t_k) + \left[\frac{1}{12}\dot{\Omega}\Omega + \frac{1}{24}\Omega\dot{\Omega}\right]\overline{Q}(t_k) + \ldots$$

Using the fact that $$\Omega(\dot{\omega}) = \Omega\left(\frac{\omega(t_{k+1}) - \omega(t_k)}{\Delta t}\right) \quad \text{Equation 28}$$
$$= \frac{1}{\Delta t}[\Omega(\omega(t_{k+1})) - \Omega(\omega(t_k))]$$

$\Omega(\overline{\omega})$ can be written as:

$$\Omega(\overline{\omega}) = \overline{\Omega} = \frac{1}{2}[\Omega(\omega(t_{k+1})) + \Omega(\omega(t_k))] = \quad \text{Equation 29}$$
$$\Omega(\omega(t_k)) + \frac{1}{2}\Omega(\dot{\omega}(t_k))\Delta t = \Omega + \frac{1}{2}\dot{\Omega}\Delta t$$

Using Equation 29 the terms in Equation 27 can be rearranged as follows (Eqn. (17-23) in Wertz)):

$$\overline{Q}(t_{k+1}) = \left[I_{4\times 4} + \frac{1}{2}\overline{\Omega}\Delta t + \frac{1}{2!}\left(\frac{1}{2}\overline{\Omega}\Delta t\right)^2 + \frac{1}{3!}\left(\frac{1}{2}\overline{\Omega}\Delta t\right)^3 + \ldots\right] \quad \text{Equation 30}$$
$$\overline{Q}(t_k) + \frac{1}{48}\left[(\dot{\Omega}\Omega - \Omega\dot{\Omega})\Delta t^3\right]\overline{Q}(t_k)$$

The first of the two terms on the right-hand side of Equation 30 is similar to the Taylor Series expansion of Equation 16, and thus has the same form. Note that this differs from Equation 16 in using time-averaged rate information rather than instantaneous rates. The second term with the derivatives of the angular rate can be expanded using Equation 26. This gives:

$$Q(t_{k+1}) = \left[e^{\frac{1}{2}\Omega(\overline{\omega})\Delta t} + \quad \text{Equation 31}\right.$$
$$\left.\frac{1}{48}(\Omega(t_{k+1}))\Omega(\omega(t_k)) - \Omega(\omega(t_k))\Omega(\omega(t_{k+1}))\Delta t^2\right]\overline{Q}(t_k)$$

In order to simplify the expression in Equation 30, the following is noted.

First, form the cross product of the angular velocities $\omega(t_k)$ and $\omega(t_{k+1})$:

$$\omega_\Delta = \omega(t_k) \times \omega(t_{k+1}) \quad \text{Equation 32}$$

For the second expression in Equation 31 the following holds:

$$\Omega(\omega_\Delta) = 2\Omega(\omega(t_{k+1})) - \Omega(\omega(t_k))\Omega(\omega(t_{k+1})) \quad \text{Equation 33}$$

i.e. the skew-symmetric form of $\omega_\Delta$ is the same as the right hand side of Equation 33. This can be verified by expanding the terms and comparing the elements. Introducing Equation 32 and Equation 33 into Equation 31, the following is derived:

$$\overline{Q}(t_{k+1}) = \left[e^{\frac{1}{2}\Omega(\overline{\omega})\Delta t} + \frac{1}{24}\Omega(\omega_\Delta)\Delta t^2\right]\overline{Q}(t_k) \quad \text{Equation 34}$$

It is noted that the second term of Equation 34, can be rewritten as:

$$\Omega(\omega_\Delta)\overline{Q}(t_k) = \begin{bmatrix} 0 \\ \omega_{\Delta x} \\ \omega_{\Delta y} \\ \omega_{\Delta z} \end{bmatrix} \otimes \overline{Q}(t_k) = \overline{Q}(\omega_\Delta) \otimes \overline{Q}(t_k) \quad \text{Equation 35}$$

Comparing the above with Equation 20-Equation 23, the following can be derived:

$$\overline{Q}(t_{k+1}) = \Delta\overline{Q} \otimes q(t_k) + \tfrac{1}{24}\Delta t^2 \overline{Q}(\omega_\Delta) \otimes Q(t_k) \quad \text{Equation 36}$$

Where $$\Delta\overline{Q} = \begin{bmatrix} \cos\left(\frac{\overline{\omega}_m}{2}\Delta t\right) \\ \frac{\overline{\omega}}{\overline{\omega}_m}\sin\left(\frac{\overline{\omega}_m}{2}\Delta t\right) \end{bmatrix}$$

is the 4×1 quaternion that represents the quaternion rotation induced by the average angular velocity $\overline{\omega}$ over time span $\Delta t$. Next, simplifying the expression results in the following:

$$\overline{Q}(t_{k+1}) = \left(\Delta\overline{Q} + \frac{1}{24}\Delta t^2 \overline{Q}(\omega_\Delta)\right) \otimes \overline{Q}(t_k) = \Delta\overline{Q}(\overline{\omega},\omega_\Delta) \otimes \overline{Q}(t_k) \quad \text{Equation 37}$$

Note that the term $(\Delta\overline{Q}\tfrac{1}{24}\Delta t^2\overline{Q}(\omega_\Delta))$ needs to be normalized.

To summarize, the computational steps for the first order quaternion integration are as follows:

Calculate $\overline{\omega} = \tfrac{1}{2}(\omega(t_{k+1}) + \omega(t_k))$

Calculate quaternion $$\Delta\overline{Q} = \begin{bmatrix} \cos\left(\frac{\overline{\omega}_m}{2}\Delta t\right) \\ \frac{\overline{\omega}}{\overline{\omega}_m}\sin\left(\frac{\overline{\omega}_m}{2}\Delta t\right) \end{bmatrix}$$

Calculate $\omega_\Delta = \omega(t_k) \times \omega(t_{k+1})$, and $$\overline{Q}(\omega_\Delta) = \begin{bmatrix} 0 \\ \omega_{\Delta x} \\ \omega_{\Delta y} \\ \omega_{\Delta z} \end{bmatrix}$$

Calculate quaternion $\Delta\overline{Q}(\overline{\omega},\omega_\Delta) = \Delta\overline{Q} + \tfrac{1}{24}\Delta t^2\overline{Q}(\omega_\Delta)$ and normalize $\Delta Q(\overline{\omega},\omega_\Delta)$ Calculate $\overline{Q}(t_{k+1}) = \Delta\overline{Q}(\overline{\omega},\omega_\Delta) \otimes \overline{Q}(t_k)$.

A computationally simpler version of the first order quaternion integration is as follows:

Given angular rates $\omega(t-\Delta t)$, $\omega(t)$, at time instants $t$ and $t-\Delta t$, and the current quaternion $\overline{Q}(t)$, define $\overline{\omega}$ as in Equation 25, and $\omega_\Delta$ as in Equation 32.

Let $\overline{Q}_{\overline{\omega}} = \begin{bmatrix} 0 \\ \overline{\omega}_x \\ \overline{\omega}_y \\ \overline{\omega}_z \end{bmatrix}$, and $\overline{Q}_{\omega_\Delta} = \begin{bmatrix} 0 \\ \omega_{\Delta_x} \\ \omega_{\Delta_y} \\ \omega_{\Delta_z} \end{bmatrix}.$ Then, compute:

$$\Delta \overline{Q} = \overline{Q}(t) \otimes \left( \frac{1}{2} \Delta t * \overline{Q}_{\overline{\omega}} + \frac{1}{24} \Delta t^2 * \overline{Q}_{\omega_\Delta} \right) \quad \text{Equation 38}$$

and, as in Equation 39 the quaternion is computed and normalized with:

$$\overline{Q}(t + \Delta t) = \overline{Q}(t) + \Delta \overline{Q}$$

$$\overline{Q}(t + \Delta t) = \frac{\overline{Q}(t + \Delta t)}{\|\overline{Q}(t + \Delta t)\|}$$

Although the description has been described with respect to particular embodiments thereof, these particular embodiments are merely illustrative, and not restrictive.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What we claim is:

1. A method of generating orientation of a device comprising;
   receiving a gyroscope output generated by a gyroscope located on a motion processing unit (MPU), the gyroscope sensing an angular velocity of the device at a first rate to generate the gyroscope output, the gyroscope and the MPU formed on a first package;
   integrating, by a processor, the gyroscope output at the first rate to generate an integrated gyroscope output, the integrated gyroscope output representing a change in the orientation of the device, the processor formed on the first package;
   receiving an accelerometer output generated by an accelerometer, the accelerometer sensing the orientation of the device to generate the accelerometer output, the accelerometer formed on the first package;
   transmitting the integrated gyroscope output to a second processor at a rate lower than the first rate thereby reducing processing requirements of the MPU, traffic from the MPU, and power consumption;
   transmitting the received accelerometer output to the second processor; and
   performing sensor fusion, by the second processor using the transmitted integrated gyroscope output and the transmitted accelerometer output to generate the orientation of the device, the second processor formed on a second package;
   receiving a requested data rate and based on the received requested data rate utilizing an output of the second processor to determine the data rate being requested,
   wherein the first and second packages are distinct package and the lower rate of the transmitted integrated gyroscope output allows use of the MPU with various sensor fusion algorithms performed by the second package and reducing power consumption.

2. The method of claim 1, further including a compass configured to measure the orientation of the device.

3. The method of claim 1, further including performing bias removal from the gyroscope output prior to the integrating step.

4. The method of claim 1, further including performing bias removal after the integrating step.

5. The method of claim 1, further including performing bias removal using a current integrated gyroscope data and a previous integrated gyroscope data and a current sensor fusion output and a previous sensor fusion output.

6. The method of claim 1, wherein the gyroscope output is set to zero if an absolute value of the gyroscope output is less than a threshold.

7. The method of claim 1, wherein the integrated gyroscope data is a form of a quaternion.

8. The method of claim 1, wherein the quaternion is normalized.

9. The method of claim 1, wherein at least a portion of the integrated gyroscope data is compressed.

10. The method of claim 1, wherein the integrating step is performed starting from an initial data.

11. The method of claim 1, wherein the integrating step has an integration time period associated with it.

12. The method of claim 1, wherein the integrating step includes generating the integrated gyroscope data from two consecutive gyroscope outputs and a previous integrated gyroscope data.

13. The method of claim 1, further comprises:
   receiving at least two consecutive gyroscope outputs from the gyroscope;
   averaging the at least two consecutive gyroscope outputs to generate an average data; and
   calculating a cross product of the at least two consecutive measurement outputs to generate a cross product data, wherein the integrating step further includes integrating over a time interval using the average data and the cross product data.

14. The method of claim 1, further comprising performing a derivation of the integrated gyroscope data to generate equivalent gyroscope data, wherein a gyroscope bias is computed using the equivalent gyroscope data, the gyroscope bias introduced by the gyroscope when sensing.

15. The method of claim 1, wherein the integrating step comprises sampling of the gyroscope output, wherein the sampling starts after a predetermined number of samples and continues over a predetermined time period.

16. The method of claim 1, wherein during a dead zone where an input of the integrating step is close to zero and the integrated gyroscope output is made to remain the same.

17. The method of claim 1, further including computing an approximate gyroscope data from the integrated gyroscope output by computing a derivate of the integrated gyroscope output, the derivative of the integrated gyroscope output used to determine a gyroscope data bias.

18. A method of generating orientation of a device, comprising:
  receiving at least two consecutive measurement outputs, at a first rate, from a gyroscope formed on a motion processing unit (MPU), each of the at least two consecutive measure outputs generated by the gyroscope sensing an angular velocity of the device, the MPU formed on a first package;
  averaging the at least two consecutive measurement outputs to generate an average data;
  calculating a cross product of the at least two consecutive measurement outputs to generate a cross product data; and
  integrating to generate a gyroscope quaternion, at the first rate using a processor, the average data, the cross product data, and the gyroscope quaternion being transmitted to a sensor fusion at a rate lower than the first rate thereby causing a reduction in a processing requirement of the MPU and reducing power consumption, the sensor fusion generating at least one output;
  receiving a requested data rate and based on the received requested data rate utilizing the at least one of the sensor fusion outputs to determine the data rate being requested,
  wherein because the sensor fusion uses data transmitted by the first package at the lower rate and the sensor fusion is externally located relative to the first package, the MPU is operational with various sensor fusion algorithms and traffic from the MPU is reduced.

19. The method of claim 18, wherein the integrating step comprises determining cosine and sine of the measurement output.

20. The method of claim 18, further including computing an approximate gyroscope data from the integrated gyroscope output by computing a derivate of the integrated gyroscope output, the derivative of the integrated gyroscope output used to determine a gyroscope data bias.

21. An apparatus for generating orientation of a device comprising;
  a gyroscope configured to sense an angular velocity of the device, at a first rate, to generate a measurement output on a motion processing unit (MPU);
  an accelerometer configured to generate sensor data representing an orientation of the device, the MPU, gyroscope, and accelerometer formed on a first package;
  a processor configured to integrate the measurement output from the gyroscope at the first rate to generate an integrated gyroscope output,
  wherein the integrated gyroscope output represents a change in the orientation of the device and wherein transmission of the integrated gyroscope output and the sensor data by the first package is performed at a rate lower than the first rate, transmission of the integrated gyroscope output being at a rate lower than the first rate thereby reducing processing requirements of the MPU and reducing power consumption;
  a sensor fusion formed on a second package located externally to the MPU and responsive to the transmitted integrated gyroscope data and sensor data from the first package and configured to generate sensor fusion outputs including the orientation of the device; and
  a data rate block responsive to a requested data rate and based on the requested data rate, the data rate block configured to utilize one of the sensor fusion outputs to determine the data rate being requested;
  wherein the lower rate allows the MPU to operate with various sensor fusion algorithms and the sensor fusion to be located externally to the MPU.

22. The apparatus of claim 21, wherein a second processor comprises the sensor fusion.

23. The apparatus of claim 21, further including a register responsive to the integrated gyroscope output and the one of the sensor fusion outputs utilized by data rate block, the one of the sensor fusion outputs utilized by data rate block being indicative of the requested data rate.

* * * * *